United States Patent [19]

Da Ré

[11] Patent Number: 5,013,600
[45] Date of Patent: May 7, 1991

[54] METHOD AND DEVICE FOR CLEANING DIE PLATES

[75] Inventor: Mario Da Ré, Turin, Italy

[73] Assignee: Fiat Auto S.p.A., Turin, Italy

[21] Appl. No.: 350,999

[22] Filed: May 10, 1989

[30] Foreign Application Priority Data

May 12, 1988 [IT] Italy .............................. 53142/88[U]

[51] Int. Cl.$^5$ .................................. B32B 3/26
[52] U.S. Cl. ................... 428/316.6; 15/118; 15/244.1; 428/317.1; 428/317.7
[58] Field of Search ............... 15/118, 209 R, 209 B, 15/209 C, 226, 244.1, 244.4; 428/316.6, 317.1, 317.7

[56] References Cited

U.S. PATENT DOCUMENTS

| | | | |
|---|---|---|---|
| 3,284,963 | 11/1966 | Lanham et al. | 15/209 C |
| 3,303,086 | 2/1967 | Demers | 428/319.3 |
| 4,338,366 | 7/1982 | Evans et al. | 15/209 B |
| 4,856,134 | 8/1989 | Wertz et al. | 15/209 B |

Primary Examiner—William J. Van Balen
Attorney, Agent, or Firm—Sughrue, Mion, Zinn Macpeak & Seas

[57] ABSTRACT

The device is particularly suitable for cleaning die plates. It consists of a compressible sheet of sponge plastics material, a layer of adhesive which is flexible and viscous at ambient temperature deposited on each face of the sheet and an outer covering sheet of non-woven fabric superposed on each layer of adhesive. In order to clean the die plates the sheet is inserted between the open plates of the die and compressed between the plates so as to exert an abrasive absorbent action on the die plates.

4 Claims, 1 Drawing Sheet

METHOD AND DEVICE FOR CLEANING DIE PLATES

BACKGROUND OF THE INVENTION

The present invention relates to a device for cleaning die plates, particularly drawing dies. During the pressing of sheet materials, foreign bodies are deposited on the dies and, although they appear insignificant, these damage the surfaces of the pressed objects and thus necessitate the provision of remedial and finishing operations This type of surface defect, which is displayed only on pressed materials, is usually known by the term "pitting". In many cases, if the foreign bodies are particularly hard, they may even penetrate the surfaces of the dies, causing considerable damage.

Currently die plates are cleaned manually with the use of cloths soaked in detergents and by mechanical operations. This has the disadvantage that the press in which the dies are mounted must be stopped for quite long periods and cleaning is therefore carried out only when the defects which appear on the surfaces of the pressed objects are particularly obvious. Moreover, since operators are required to work directly on the inside of the die plates, there is a high risk of accidents.

SUMMARY OF THE INVENTION

The object of the present invention is, therefore, to provide a device for cleaning die plates quickly and without direct human intervention.

According to the invention, this object is achieved by virtue of a device characterised in that it is constituted by a compressible sheet of foamed plastics material, a layer of adhesive which is flexible and viscous at ambient temperature deposited on each face of the sheet and an outer covering sheet of non-woven fabric superposed on each layer of adhesive.

BRIEF DESCRIPTION OF THE DRAWINGS

Further characteristics and advantages of the present invention will become clear from the detailed description which follows with reference to the appended drawings, provided by way of non-limiting example, in which.

DETAILED DESCRIPTION OF THE INVENTION

Figure 1:
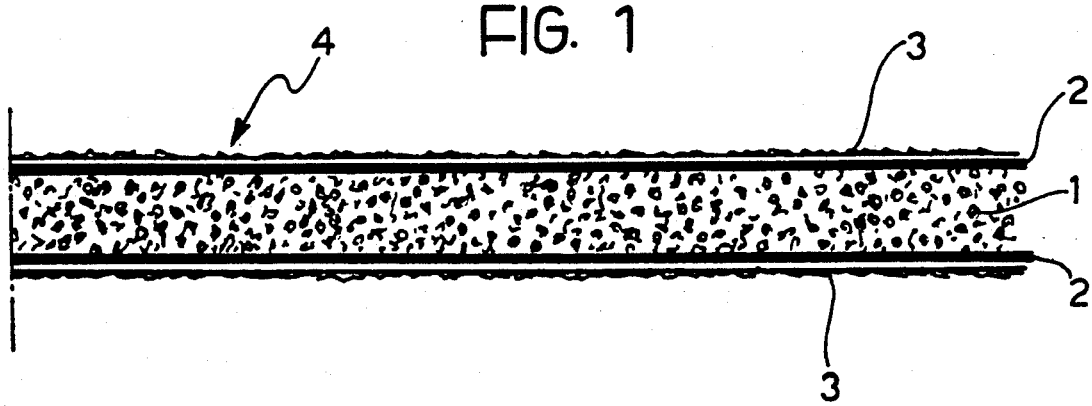
FIG. 1 is a cross-section of a device according to the invention.
Figure 2:
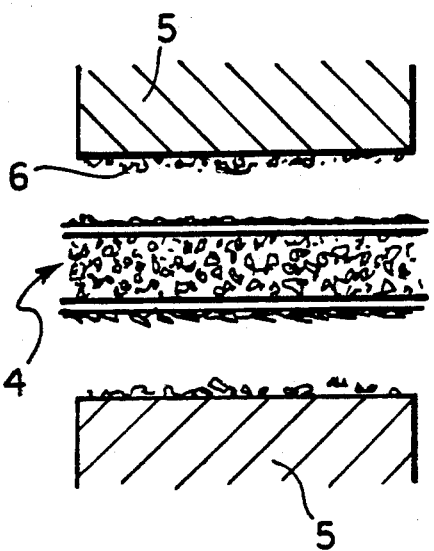
FIGS. 2, 3 and 4 show successive stages in a method for cleaning die plates with the use of a device according to the invention.

With reference to the drawings, a device according to the invention is constituted by a compressible sheet 1 of sponge plastics material, for example polyurethane. Both faces of the sheet 1 are covered with layers 2 of an adhesive which is flexible and viscous at ambient temperature, and is preferably selected from the group including rubber latex and acrylic adhesives. The adhesive layers 2 are in turn covered by sheets 3 of non-woven fabric having a fairly loose structure to allow the penetration of any foreign bodies 6 present on the die plates 5. The covering of the adhesive layers with sheets of non-woven fabric facilitates the handling of the device since its outer surfaces, thus protected, are non-adhesive. They become adhesive only when the sheet device is subjected to a considerable mechanical compressive load. The cleaning of a die is carried out by the insertion of the sheet device between its open plates 5 (FIG. 2).

Figure 3:
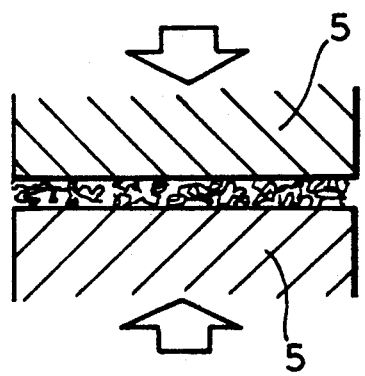

The plates 5 are then closed (FIG. 3) with consequent compression of the sheet 1 which exerts an abrasive-absorbent action on the plates 5 and thus assimilates the foreign bodies 6 into it.

Figure 4:
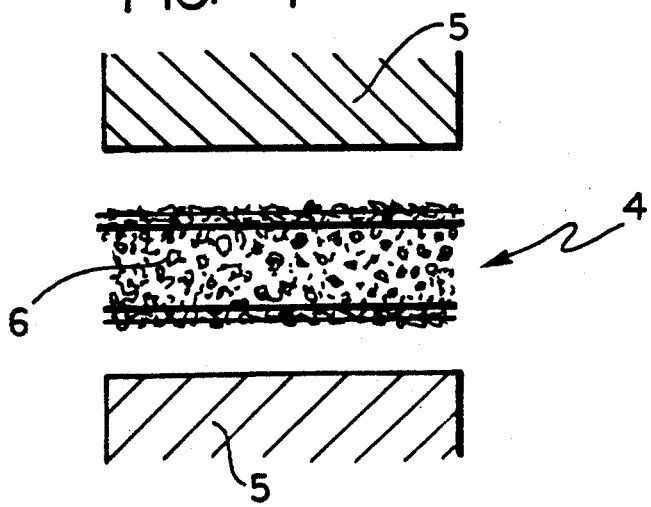

When the plates 5 are reopened (FIG. 4), they are cleansed of the foreign bodies 6 which have been absorbed into the sheet 1.

Obviously the dimensions of the device must be at least equal to those of the plates 5 and its density and rigidity are selected in dependence on the nature and magnitude of the foreign bodies 6.

It is obvious that the cleaning method just described takes a very short period of time, the same as that required for a moulding cycle, since the device can be introduced between the plates 5 as if it were an ordinary component to be moulded, without the need for special measures.

A series of periodic operations of a preventive nature can thus be considered to remove the foreign bodies as soon as they have been deposited on the plates 5, ensuring that the quality of the moulded elements remains constant and preventing progressive damage to the plates 5.

I claim:

1. A device for cleaning die plates, comprising a compressible sheet of sponge plastics material, a layer of adhesive which is flexible and viscous at ambient temperature deposited on each face of the sheet and an outer covering sheet of non-woven fabric superposed on each layer of adhesive.

2. A device according to claim 1, wherein the sheet is constituted by a polyurethane foam.

3. A device according to claim 1, wherein the adhesive is selected from a group consisting of rubber latex and acrylic adhesives.

4. A method for cleaning die plates to remove deposited foreign bodies, comprising the steps of:
  inserting between the die plates in an open condition a cleaning device comprising a compressible sheet of sponge plastics material, a layer of adhesive which is flexible and viscous at ambient temperature deposited on each face of the sheet and an outer covering sheet of non-woven fabric superposed on each layer of adhesive;
  closing the die plates to compress said device with pressure such as to cause an abrasive absorbent action of said device on the die plates; and
  reopening the plates and extracting from the plates the cleaning device.

* * * * *